United States Patent [19]

Mirikidani

[11] Patent Number: 4,534,213

[45] Date of Patent: Aug. 13, 1985

[54] EXHAUST MONITORING SENSOR FOR A CLOSED-LOOP AIR-TO-FUEL RATIO CONTROL SYSTEM OF A MULTIPLEX EXHAUST MANIFOLD ENGINE

[75] Inventor: Tatsumi Mirikidani, Yokohama, Japan

[73] Assignee: Nissan Motor Company, Limited, Yokohama, Japan

[21] Appl. No.: 447,252

[22] Filed: Dec. 6, 1982

[30] Foreign Application Priority Data

Jan. 12, 1982 [JP] Japan .................................... 57-2486

[51] Int. Cl.[3] ...................... G01N 27/46; G01N 25/02

[52] U.S. Cl. ............................................ 73/118; 73/23

[58] Field of Search ...................... 73/23, 118; 123/440

[56] References Cited

U.S. PATENT DOCUMENTS 4,033,170 7/1977 Kawamura ............................ 73/23
4,214,473 7/1980 Edwards ................................ 73/23
4,274,373 6/1981 Sugasawa ........................... 123/440

FOREIGN PATENT DOCUMENTS 5627394 6/1981 Japan .

*Primary Examiner*—John W. Caldwell, Sr.
*Assistant Examiner*—Ellwood Harding
*Attorney, Agent, or Firm*—Schwartz, Jeffery, Schwaab, Mack, Blumenthal & Evans

[57] ABSTRACT

An exhaust monitoring sensor, such as an oxygen sensor, is used in an engine equipped with an exhaust system including first and second parallel pipes. The first and second pipes form respectively first and second exhaust passages through which exhaust gases can flow. A portion of the walls of the first pipe is common to a portion of the walls of the second pipe to form a partition wall separating the first and second exhaust passages. The partition wall has a hole extending therethrough. The sensor includes an exhaust-gas sampling tube extending from the first to the second exhaust passage through the hole. The tube has a bore, and first, second, and third openings. The bore communicates with the second exhaust passage via the second and third openings. The bore communicates with the first exhaust passage via the first opening. The sensor also includes an exhaust sensing section. At least part of the sensing section is located in the bore of the tube.

11 Claims, 8 Drawing Figures

EXHAUST MONITORING SENSOR FOR A CLOSED-LOOP AIR-TO-FUEL RATIO CONTROL SYSTEM OF A MULTIPLEX EXHAUST MANIFOLD ENGINE

BACKGROUND OF THE INVENTION

1. Field of the Invention

This invention relates to an exhaust monitoring sensor, such as an oxygen sensor, for a closed-loop air-to-fuel ratio control system of a multiplex exhaust manifold engine.

2. Description of the Prior Art

It is known to regulate the air-to-fuel ratio of an air/fuel mixture at an optimal level by means of a closed-loop or feed-back control system in an internal combustion engine. Such a control system typically has an oxygen sensor for sensing oxygen concentration in the exhaust gas, which is indicative of the air-to-fuel ratio. The oxygen sensor is usually attached to an engine exhaust manifold to be exposed to exhaust gas.

Some engines have a dual exhaust manifold which consists of two independent submanifolds. Each of the submanifolds combines the exhaust ducts from a plurality of engine cylinders into a single common passage. The common passages of the two submanifolds are usually adjacent and separated by a common partition wall.

In the case of the above dual-exhaust-manifold engine, the sensing element of the oxygen sensor is disposed in a small hole in the partition wall to be exposed to exhaust gases flowing through both of the exhaust submanifolds. However, such an arrangement of the oxygen sensor entails an extremely small positional tolerance, since the sensing element should be centered within the small hole in the partition wall to ensure the reliability of the sensor.

SUMMARY OF THE INVENTION

It is an object of this invention to provide an exhaust monitoring sensor for a closed-loop air-to-fuel ratio control system of a multiplex exhaust manifold engine which permits greater positional tolerances.

In accordance with this invention, an exhaust monitoring sensor is used for an engine equipped with an exhaust system including first and second parallel pipes. The first and second pipes form respectively first and second exhaust passages through which exhaust gases can flow. A portion of the walls of the first pipe is common to a portion of the walls of the second pipe to form a partition wall separating the first and second exhaust passages. The partition wall has a hole extending therethrough. The sensor includes an exhaust-gas sampling tube extending between the first and the second exhaust passages through the hole. The tube has a bore, and second inlet openings, and an outlet opening. The bore communicates with the second exhaust passage via the second opening and third openings. The bore communicates with the first exhaust passage via the first opening. The tube thus defines first and second exhaust gas flow paths, between the first inlet opening and outlet opening, and between the second inlet opening and outlet opening, respectively. These flow paths have a common portion terminating at the outlet opening. The sensor also includes an exhaust sensing section. The sensing section is located in the bore of the tube in the common portion of the flow paths defined therein.

The above and other objects, features and advantages of this invention will be apparent from the following description of preferred embodiments thereof, taken in conjunction with the drawings.

BRIEF DESCRIPTION OF THE DRAWINGS

Like reference numerals denote like parts throughout the drawings.

DESCRIPTION OF THE PREFERRED EMBODIMENTS

Figure 1:
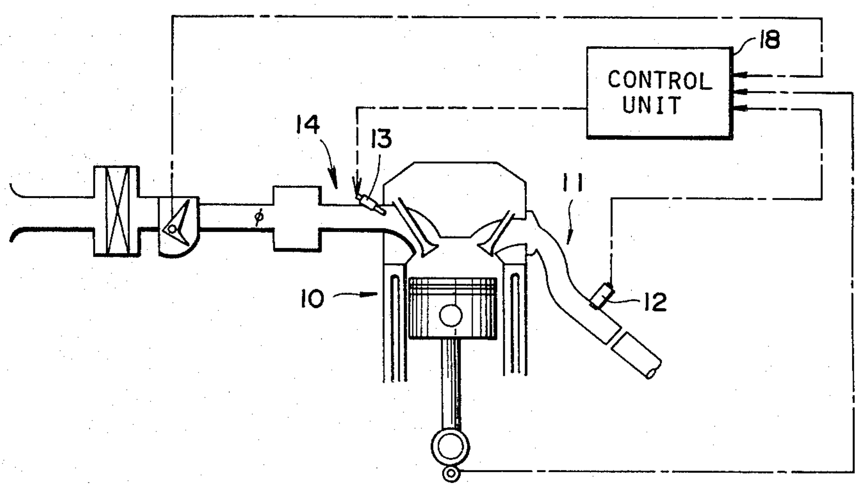
FIG. 1 is a diagrammatic view of a closed-loop air-to-fuel ratio control system of an internal combustion engine which includes an exhaust monitoring sensor according to a first embodiment of this invention.

With reference to FIG. 1, there is shown a closed-loop air-to-fuel ratio control system for a four-cylinder, in-line internal combustion engine 10 which has an exhaust system 11 equipped with an exhaust monitoring sensor 12, such as an oxygen sensor, according to a first embodiment of this invention. The sensor 12 is exposed to exhaust gas flowing through the exhaust system 11 and generates a signal indicative of the air-to-fuel ratio as indicated by the composition of the exhaust gas. The closed-loop control system includes one or more fuel-injection valves 13 attached to an air intake system 14 of the engine 10 to inject fuel into air drawn into the engine 10 via the air intake system 14. A computerized control unit 18 drives the fuel-injection valves 13 in response to the signal from the sensor 12 in such a way as to regulate the air-to-fuel ratio of the air/fuel mixture at an optimal level. The above-mentioned closed-loop control system is designed in a manner similar to that of the conventional type except for the specific arrangement of the exhaust monitoring sensor 12, which will be described hereafter.

Figure 2:
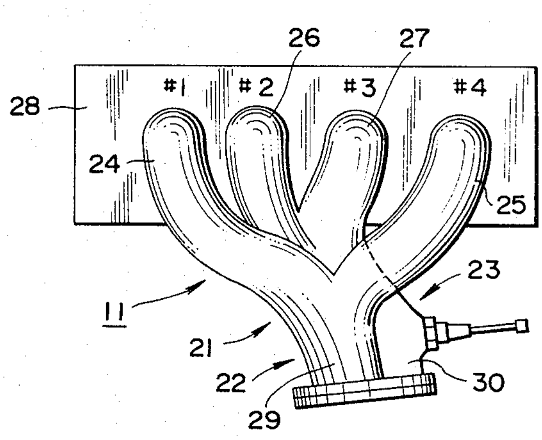
FIG. 2 is a perspective view of the portion of the engine exhaust system provided with the sensor of FIG. 1.

As shown in FIG. 2, the exhaust system 11 includes a dual exhaust manifold 21 consisting of two independent submanifolds 22 and 23. The submanifold 22 has two branches 24 and 25 at the upstream part thereof. The other submanifold 23 similarly has two branches 26 and 27. The submanifolds 22 and 23 are attached to an engine block 28 in such a manner that the branches 24, 25, 26 and 27 can communicate with engine cylinders #1, #4, #2, #3, respectively, formed in the engine block 28. In the case of a four-cylinder, in-line engine, exhaust pressures from the respective cylinders #1 and #2 have essentially no influence on those from the respective cylinders #4 and #3, respectively, and vice versa. Therefore, the dual exhaust manifold 21 ensures unimpeded engine exhaustion and thereby improves engine performance.

The submanifold 22 has a common pipe 29 downstream of the junction of the branches 24 and 25. The other submanifold 23 has a similar common pipe 30 downstream of the junction of the branches 26 and 27. The walls of the pipes 29 and 30 are connected as will be described in more detail hereinafter. The sensor 12 is attached to the pipe 30.

Figure 3:
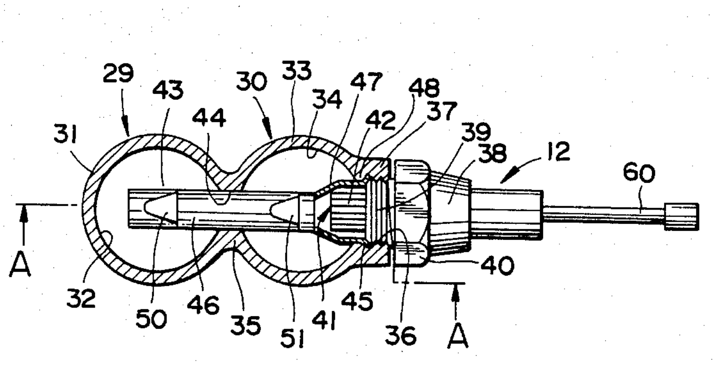
FIG. 3 is a cross-sectional view of the exhaust submanifolds with the sensor of FIG. 2.
Figure 4:
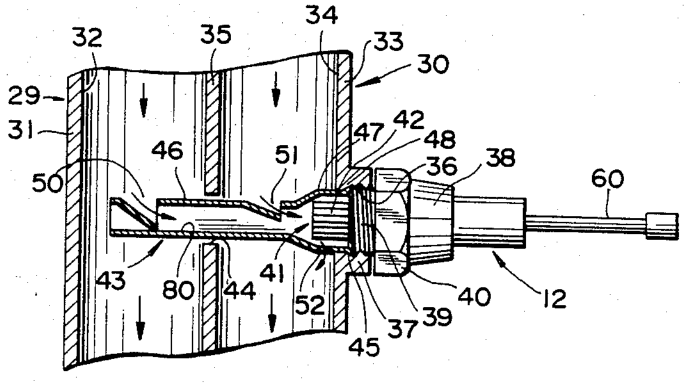
FIG. 4 is a sectional view of the exhaust submanifolds with the sensor taken along line A—A of FIG. 3.

As shown in FIGS. 3 and 4, the pipe 29 has peripheral walls 31 defining an exhaust passage 32 through the pipe 29. The other pipe 30 has peripheral walls 33 defining a similar exhaust passage 34 through the pipe 30. The pipes 29 and 30 are parallel and have a common wall 35 therebetween which is part of the walls 31 as well as part of the walls 33. The common wall 35 constitutes an axial partition wall separating the adjacent exhaust passages 32 and 34.

The walls 33 have a circular hole 36 extending therethrough at a point opposite the partition wall 35. The hole 36 extends essentially radially with respect to the pipe 30. Part of the walls 33 around the hole 36 protrudes outwardly to form an annular boss 37 surrounding the hole 36. The interior of the boss 37, that is, the hole 36 except the inner end thereof, is threaded. The sensor 12 has a cylindrical casing or body 38, one end of which is provided with a threaded periphery 39. The threaded end 39 of the casing 38 mates with the threaded part of the hole 36, and extends into the latter so that the casing 38 is detachably secured to the walls 33. The casing 38 has a hexagonal head 40 adjacent to the threaded end 39 and outside of the pipe 30 so that the casing 38 can be manually secured with a suitable tool.

The sensor 12 has a cylindrical sensing section 41 extending coaxially from the casing end 39. The sensing section 41 projects slightly out of the hole 36 when the casing 38 is set in place. The sensing section 41 includes a cylindrical sensing element (not shown) and a hollow cylindrical louver 42 coaxially covering the sensing element. The louver 42 can pass gas to expose the sensing element to the gas. The louver 42 and the sensing element are secured coaxially to the casing 38.

The sensor 12 has a cylindrical exhaust-gas sampling tube 43 extending axially with respect to the casing 38, and thus radially or diametrically with respect to the pipes 29 and 30. The partition wall 35 has a circular hole 44 at a position roughly opposite the hole 36 in the walls 33. The hole 44 extends through the partition wall 35 and is generally aligned with the hole 36. The tube 43 extends from the casing end 39 through the passage 34 and the hole 44 into the passage 32, ending slightly beyond the center thereof.

Figure 5:
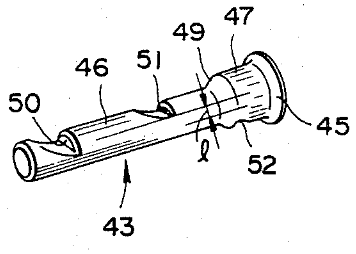
FIG. 5 is a perspective view of the sensor tube of FIGS. 3 and 4.

As is also shown in FIG. 5, the sampling tube 43 consists of an outwardly-extending flanged end 45, a smaller-diameter portion 46, and a larger-diameter portion 47 between the end 45 and the portion 46. The tube 43 also has a tapering connection 49 between the portions 46 and 47. The walls 33 defining the hole 36 have a small annular shoulder 48 between the threaded part of the hole 36 and the non-threaded end thereof, i.e. the hole 36 is stepped in such a manner that the diameter of the non-threaded end of the hole 36 is slightly smaller than the minimum diameter of the threaded part of the hole 36. The flange 45 is firmly sandwiched between the shoulder 48 and the threaded end 39 of the casing 38, so that the tube 43 is secured to the casing 38 and the walls 33. In this case, the flange 45 is designed to serve as a sealing member to prevent exhaust gas leakage along the periphery of the casing 38. To ensure the sealing action, the casing 38 needs to be rotated during the attachment thereof until the casing 38 firmly compresses the flange 45 against the shoulder 48.

The larger-diameter portion 47 extends through the non-threaded end of the hole 36. The outside diameter of the portion 47 is essentially equal to the diameter of the non-threaded end of the hole 36 to fit snugly in the latter. The larger-diameter portion 47 extends at least as far axially as the sensing section 41. The inside diameter of the portion 47 is somewhat greater than the outside diameter of the sensing section 41, so that the larger-diameter portion 47 concentrically surrounds the sensing section 41 with an annular gap of predetermined dimensions formed therebetween.

The smaller-diameter portion 46 extends from the passage 34 into the other passage 32 via the hole 44. The outside diameter of the portion 46 is slightly smaller than the diameter of the hole 44, so that the resulting gap or clearance in the hole 44 is relatively small. As a result, undesirable communication between the passages 32 and 34 via the clearance is limited acceptably. The axes of the portions 46 and 47 are offset by a predetermined distance l, as best shown in FIG. 5. The axes of the holes 36 and 44 are offset similarly. These offset structures and the small clearance in the hole 44 are designed so that rotation of the sampling tube 43 will be prevented even if rotational force is exerted on the tube 43, for example, during attachment of the casing 38 and the tube 43 to the walls 33.

The sampling tube 43 has a bore 80 extending therethrough, and also has openings 50, 51, and 52 communicating with the bore 80. These correspond to first and second inlet openings, and the outlet opening, respectively. The opening 50 is formed through the walls of the smaller-diameter portion 46 located near or at the center of the passage 32 and on the upstream side with respect to exhaust gas flow through the passage 32. The opening 51 is formed through the walls of the portion 46 located near or at the center of the other passage 34 and on the upstream side with respect to exhaust gas flow through the passage 34. For example, each of the openings 50 and 51 is formed by the following steps: First, the portion 46 is cut partway along a preset radial plane. Second, the walls of the portion 46 on the side of the cut distal from the larger-diameter portion 47 are bent inwardly to form an opening. In regard to the opening 50, the edges of the bent walls reach or contact the opposing walls to block the distal end of the bore 80, thereby effectively, though not necessarily completely, sealing the distal end of the tube 43. In regard to the opening 51, the edges of the bent walls do not contact the opposing walls to maintain communication through the bore 80 at this point. The opening 52 is formed through the walls of the larger-diameter portion 47 at such a position that the opening 52 faces the downstream side of the passage 34. Note that the end of the tube 43 opposite the flanged end 45 may be closed, although it is open in the embodiment shown in FIGS. 1 to 5.

A small proportion of exhaust gas flowing through the passage 32 enters the tube 43 via the opening 50 and flows along the bore 80 along a first path of exhaust gas flow before exiting via the opening 52. A small proportion of exhaust gas flowing through the passage 34 enters the tube 43 via the opening 51 and flows along the bore 80 along a second path of exhaust gas flow before exiting via the opening 52. Thus, the exhaust gas from the passage 32 mixes with the exhaust gas from the other passage 34 in the bore 80 downstream of the opening 51 in a portion common to both flow paths. The sensing section 41 projects axially beyond the opening 52 to be exposed to the current of the resulting exhaust gas mixture in common portion of bore 80. The louver 42 passes the resulting exhaust gas mixture to expose the sensing element to the mixture. To equalize the rates of flows of exhaust gases from the passages 32 and 34 into the tube 43, the effective area of the opening 50 is chosen to be larger than that of the opening 51, since the opening 50 is more remote from the opening 52 than the opening 51 is. This equalization ensures a reliably represenative exhaust sample for the sensor 12. In other words, the output of the sensor 12 can indicate the average air-to-fuel ratio of the air/fuel mixtures drawn into the cylinders #1, #2, #3, and #4. In the case of a typical oxygen sensor, the output of the sensor 12 is in the form of a binary signal indicating whether or not the air/fuel mixture is richer (or leaner) than stoichiometric. The effective areas of the openings 50 and 51 are much smaller than the cross-sectional areas of the passages 32 and 34 to acceptably reduce the resulting communication between the passages 32 and 34.

Leads 60 extend outwardly from the casing 38, and are used to electrically connect the sensing element of the section 41 to the control unit 18 (see FIG. 1) to transmit the air-to-fuel ratio signal from the sensing element to the unit 18.

Figure 6:
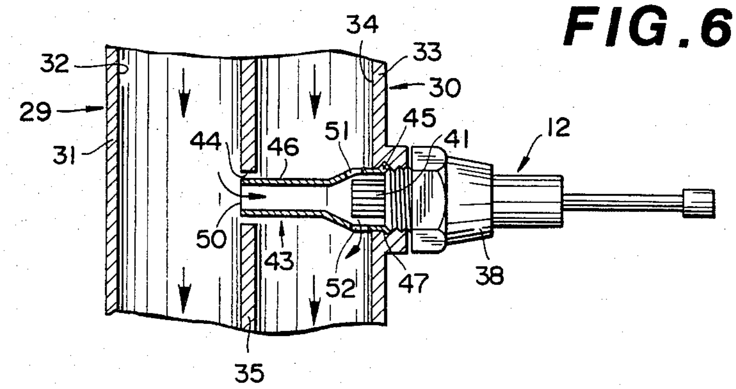
FIG. 6 is a longitudinal-sectional view of exhaust submanifolds with an exhaust monitoring sensor according to a second embodiment of this invention.

FIG. 6 shows a second embodiment of this invention, which is designed in a manner similar to that of the first embodiment except for the following arrangements: The smaller-diameter portion 46 of an exhaust-gas sampling tube 43 terminates at the end of the hole 44 adjoining the passage 32. The end face of the portion 46 is essentially flush with the surfaces of the partition wall 35 defining the passage 32. The end of the portion 46 is open to form an opening 50. The opening 51 is formed through the walls of the larger-diameter portion 47 opposing the opening 52.

Figure 7:
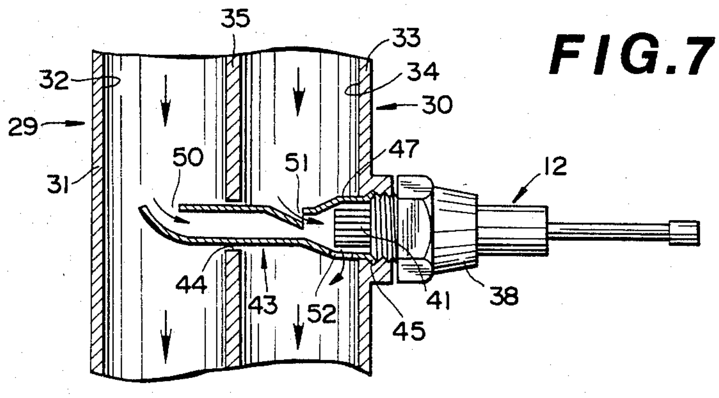
FIG. 7 is a longitudinal-sectional view of exhaust submanifolds with an exhaust monitoring sensor according to a third embodiment of this invention.

FIG. 7 shows a third embodiment of this invention, which is designed in a manner similar to that of the first embodiment except for the following arrangement: The distal end of an exhaust-gas sampling tube 43, i.e., the end in the passage 32, is open, and curves toward the upstream direction so that the opening at the end of the tube 43 in the passage 32 faces upstream, and constitutes an opening 50.

Figure 8:
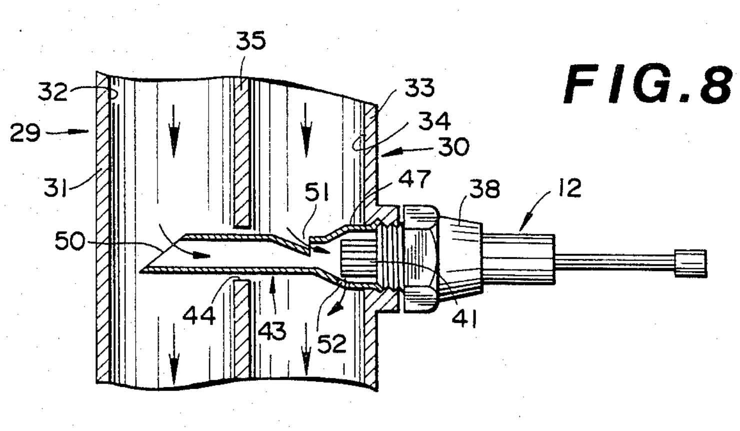
FIG. 8 is a longitudinal-sectional view of exhaust submanifolds with an exhaust monitoring sensor according to a fourth embodiment of this invention.

FIG. 8 shows a fourth embodiment of this invention, which is designed in a manner similar to that of the first embodiment except for the following arrangement: The distal end of an exhaust-gas sampling tube 43, i.e., the end in the passage 32, is open. The end face of the tube 43 in the passage 32 lies in a plane oblique with respect to the upstream direction so that the opening of the tube end faces in a direction inclined from the upstream direction at an acute angle. An opening 50 consists of this opening at the tube end.

It should be understood that further modifications and variations may be made in this invention without departing from the spirit and scope of this invention as set forth in the appended claims.

What is claimed is:

1. An exhaust monitoring system for an engine having an exhaust system including first and second exhaust gas passages for passing exhaust gasses from said engine, a wall portion of said first exhaust gas passage coinciding with a wall portion of said second exhaust passage to form a partition wall separating said first and second exhaust gas passages, said partition wall having a hole extending therethrough, the exhaust monitoring system comprising:

an exhaust gas sampling tube extending between said first and second exhaust gas passages through said hole, said tube having a first inlet opening disposed in said first exhaust gas passage to sample exhaust gas flowing therein and a second inlet opening disposed in said second exhaust gas passage to sample exhaust gas flowing therein and an outlet opening disposed in said second exhaust passage for venting said sampled exhaust gases into said second exhaust passage, the sampling tube defining a first path of exhaust gas flow from the first inlet opening to the outlet opening and a second path of exhaust gas flow from the second inlet opening to the outlet opening, the first and second paths having a common portion terminating at the outlet opening; and an exhaust gas sensor section disposed in said tube at a location within the common portion of the first and second paths.

2. An exhaust monitoring sensor as recited in claim 1, further comprising an attaching body secured to the second exhaust passage, the attaching body holding the exhaust gas sensor section.

3. An exhaust monitoring sensor as recited in claim 2, wherein the second exhaust passage has an at least partially threaded hole extending through a wall portion thereof, and wherein the attaching body has a threaded periphery engageable with the at least partially threaded hole to secure the attaching body to the second exhaust passage.

4. An exhaust monitoring sensor as recited in claim 3, wherein the wall portion of the second exhaust passage has an annular shoulder adjacent said at least partially threaded hole, and wherein the tube has a flanged open end sandwiched between the shoulder and the attaching body when the attaching body is secured to the second exhaust passage.

5. An exhaust monitoring sensor as recited in claim 4, wherein the sensor section extends from the attaching body to the tube and through the at least partially threaded hole in the second exhaust passage and the open end of the tube.

6. An exhaust monitoring sensor as recited in claim 5, wherein the tube extends generally perpendicular to axes of the second inlet and second exhaust passages, wherein the first opening is formed through a wall of the tube on the upstream side with respect to exhaust-gas flow through the second exhaust passage, wherein the outlet opening is formed through the wall of the tube on the downstream side, and wherein the sensing section extends beyond the third opening in an axial direction with respect to the tube.

7. An exhaust monitoring sensor as recited in claim 6, wherein the first inlet opening is disposed on an upstream side of said tube with respect to exhaust-gas flow through the first exhaust passage.

8. An exhaust monitoring sensor as recited in claim 6, wherein the second inlet opening and the outlet opening are disposed on opposite sides of said tube with respect to exhaust-gas flow.

9. An exhaust monitoring sensor as claimed in claim 1, wherein the sampling tube is arranged to have a longitudinal axis thereof transverse to the partition wall and thus to extend transversely through the partition wall.

10. An exhaust monitoring system for an engine having an exhaust system including first and second exhaust gas passages for passing exhaust gases from said engine, a wall portion of said first exhaust gas passage coinciding with a wall portion of said second exhaust passage to form a partition wall separating said first and second exhaust passages, said partition wall having a hole extending therethrough, the exhaust monitoring system comprising:

an at least partially threaded hole extending through a wall portion of said second exhaust passage and having an annular shoulder adjacent thereto;

an attaching body secured to said wall portion and having a threaded periphery engagable with said at least partially threaded hole;

an exhaust gas sampling tube extending between said first and second exhaust gas passages generally perpendicular to axes of said first and and exhaust passages through said hole and said at least partially threaded hole, said tube having a first inlet opening disposed in said first exhaust gas passage to sample exhaust gas flowing therein, a second inlet opening disposed in said second exhaust gas passage and formed through a wall of said tube on the upstream side of said tube with respect to exhaust gas flow through said second passage to sample exhaust gas flowing therein, and an outlet opening disposed in said second exhaust gas passage and formed through the downstream wall of the tube for venting said sampled exhaust gases into said second exhaust passage, the sampling tube defining a first path of exhaust gas flow from the first inlet opening to the outlet opening and a second path of exhaust gas flow from the second inlet opening to the outlet opening, the first and second paths having a common portion terminating at the outlet opening, said tube further having a flanged open end adapted to be sandwiched between said shoulder and said attaching body; and an exhaust gas sensor section extending from said attaching body to the tube beyond said third outlet opening in an axial direction with respect to said tube at a location within the common portion of the first and second paths, wherein said first opening comprises an open end of said tube, said open end facing said exhaust-gas flow in said first exhaust gas passage in a direction inclined at an acute angle toward said exhaust-gas flow.

11. An exhaust monitoring system for an engine having an exhaust system including first and second exhaust gas passages for passing exhaust gases from said engine, a wall portion of said first exhaust gas passage coinciding with a wall portion of said second exhaust passage to form a partition wall separating said first and second exhaust passages, said partition wall having a hole extending threrethrough, the exhaust monitoring system comprising:

an at least partially threaded hole extending through a wall portion of said second exhaust passage and having an annular shoulder adjacent thereto;

an attaching body secured to said wall portion and having a threaded periphery engagable with said at least partially threaded hole;

an exhaust gas sampling tube extending between said first and second exhaust gas passages generally perpendicular to axes of said first and and exhaust passages through said hole and said at least partially threaded hole, said tube having a first inlet opening disposed in said first exhaust gas passage to sample exhaust gas flowing therein, a second inlet opening disposed in said second exhaust gas passage and formed through a wall of said tube on the upstream side of said tube with respect to exhaust gas flow through said second passage to sample exhaust gas flowing therein, and an outlet opening disposed in said second exhaust gas passage and formed through the downstream wall of the tube for venting said sampled exhaust gases into said second exhaust passage, the sampling tube defining a first path of exhaust gas flow from the first inlet opening to the outlet opening and a second path of exhaust gas flow from the second inlet opening to the outlet opening, the first and second paths having a common portion terminating at the outlet opening, said tube further having a flanged open end adapted to be sandwiched between said shoulder and said attaching body; and an exhaust gas sensor section extending from said attaching body to the tube beyond said third outlet opening in an axial direction with respect to said tube at a location within the common portion of the first and second paths, wherein said first opening comprises an open end of said tube which opens into said first passage, said end being essentially flush with the partition wall.

* * * * *